United States Patent [19]

Horak et al.

[11] 4,232,329
[45] Nov. 4, 1980

[54] MULTICHANNEL RECORDING FORMAT FOR A SAMPLED-ANALOG COLOR VIDEO SIGNAL

[75] Inventors: Jerry R. Horak; Peter L. P. Dillon, both of Rochester; Ronald R. Firth, Fairport, all of N.Y.

[73] Assignee: Eastman Kodak Company, Rochester, N.Y.

[21] Appl. No.: 957,269

[22] Filed: Nov. 3, 1978

[51] Int. Cl.$^3$ .............................................. A04N 5/76
[52] U.S. Cl. ........................................ 358/9; 360/33; 360/22
[58] Field of Search ...................... 360/33, 22, 23, 9; 358/127, 4, 9

[56] References Cited

U.S. PATENT DOCUMENTS

| | | | |
|---|---|---|---|
| Re. 25,809 | 6/1965 | Johnson | 360/26 |
| 2,423,770 | 7/1947 | Goldsmith | 358/12 |
| 2,527,967 | 10/1950 | Schroder | 358/146 |
| 2,881,255 | 4/1959 | Hall | 179/15 R |
| 2,892,022 | 6/1959 | Houghton | 358/9 |
| 2,952,745 | 9/1960 | Walker | 360/23 |
| 3,188,648 | 6/1965 | Cecil | 360/23 |
| 3,327,299 | 6/1967 | Johnson | 360/26 |
| 3,502,795 | 3/1970 | Camras | 358/9 |
| 3,512,094 | 5/1970 | Dann | 358/137 |
| 3,524,012 | 8/1970 | Kihara | 358/9 |
| 3,553,080 | 1/1971 | Hommond | 360/33 |
| 3,683,107 | 8/1972 | Camras | 358/9 |
| 3,683,111 | 8/1972 | Southworth | 358/138 |
| 3,700,793 | 10/1972 | Borsuk | 358/142 |
| 3,806,640 | 4/1974 | Furukawa | 360/23 |
| 3,921,211 | 11/1975 | Lung | 360/47 |
| 3,971,065 | 7/1976 | Bayer | 358/41 |
| 3,975,764 | 8/1976 | Kobayashi | 360/23 |
| 4,047,203 | 9/1977 | Dillon | 358/44 |
| 4,148,059 | 4/1979 | Dillon | 358/37 |

Primary Examiner—Alfred H. Eddleman
Assistant Examiner—Alan Faber
Attorney, Agent, or Firm—Thomas H. Close

[57] ABSTRACT

A color video signal composed of successive groups of analog color samples, successive samples in at least some of said groups alternating between one color and another, wherein such groups represent successively scanned rows or lines of video frames or fields, is processed, prior to recording, by assigning respective samples to one of a plurality of channels of substantially equal bandwidth in a manner such that respective channels contain subgroups of samples representing only one color per subgroup, thereby minimizing the power at the sampling frequency in such channels. The information in the channels is recorded on a corresponding plurality of tracks on a recording medium by multichannel essentially-fixed-head recording apparatus thereby realizing the manufacturing economy of essentially-fixed-head type apparatus. In one embodiment of the invention, samples of a first color occur more frequently in the color video signal than do samples of a second color, thereby maximizing the utilization of the information storage capacity of the recording medium.

In a preferred implementation, the color video signal is generated by a solid state image sensing array having discrete image sensing elements selectively sensitized to green, red, or blue. Green-sensitive elements occur more frequently in the array than do red- or blue-sensitive elements in recognition of the fact that human visual acuity is higher for green, than for red or blue. The signal is separated sample-by-sample and the samples assigned to eight channels in a manner such that for each group of samples, the samples representing green (green samples) occupy four of the eight channels, and the samples representing red (red samples) and/or blue (blue samples) occupy the other four channels.

12 Claims, 29 Drawing Figures

SIGNAL FORMAT — RECORDING
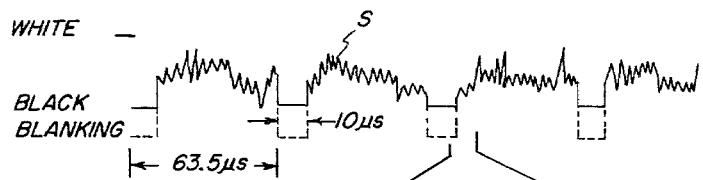
FIG. 6a
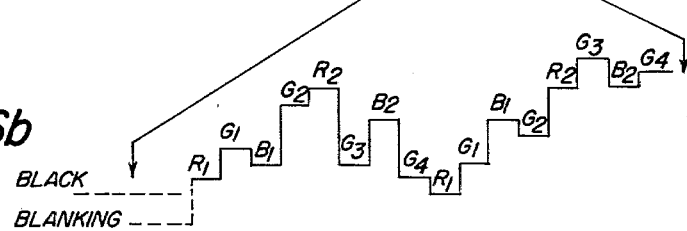
FIG. 6b
FIG. 6c  $R_1$
FIG. 6d  $S_1$
FIG. 6e  $G_1$
FIG. 6f  $S_2$
FIG. 6g  $G_4$
FIG. 6h  $S_8$

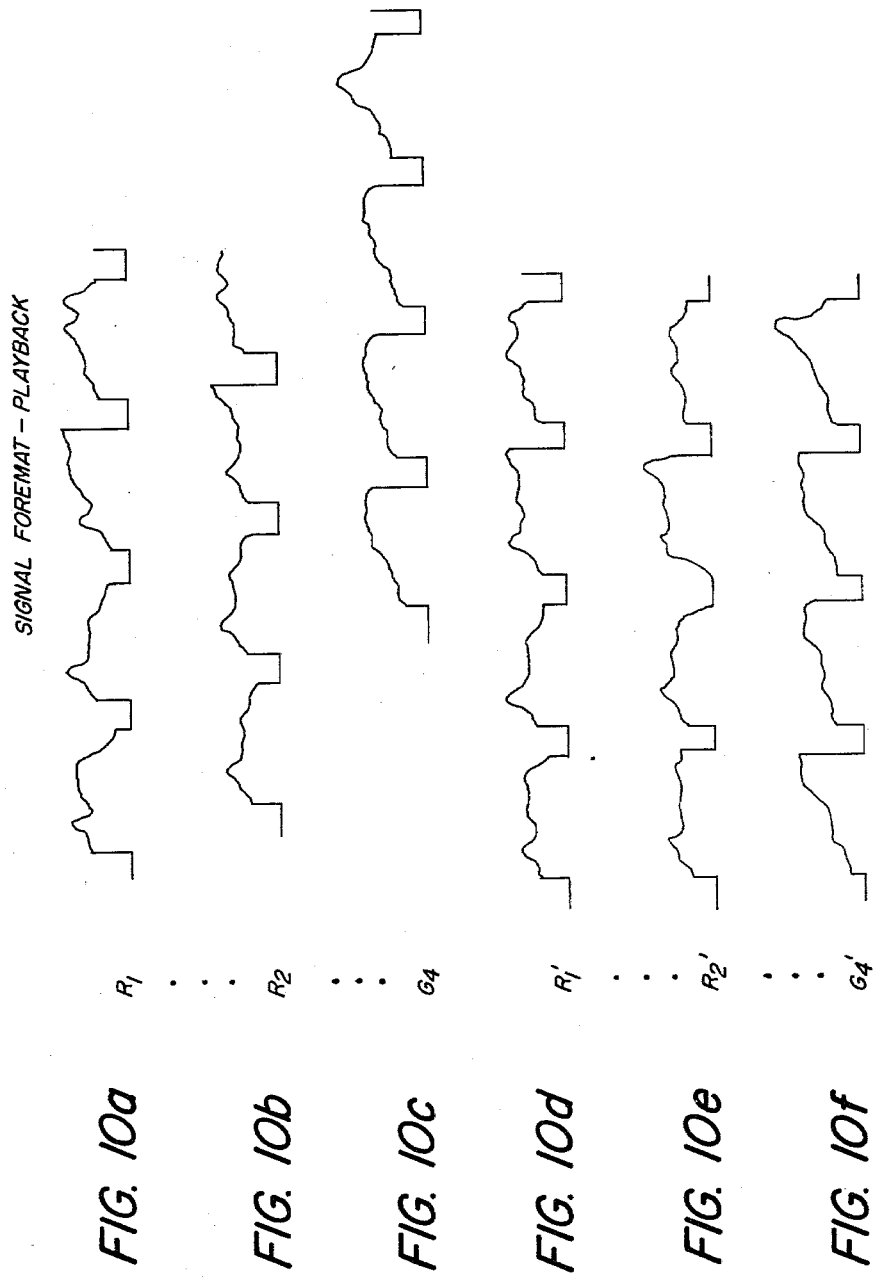

FIG. 10L $\hat{R}$

FIG. 10m COMP VIDEO

MULTICHANNEL RECORDING FORMAT FOR A SAMPLED-ANALOG COLOR VIDEO SIGNAL

BACKGROUND OF THE INVENTION

1. Field of The Invention

The present invention relates to a method and apparatus for recording and reproducing a sampled-analog color video signal; and to recordings produced by such method and apparatus. More particularly, it relates to such method and apparatus for recording and reproducing wherein samples comprising the signal are assigned to respective channels of a plurality of channels. The information in the channels is recorded on a plurality of parallel tracks—one track per channel—on a recording medium.

2. Discussion Relative to The Prior Art

Recently, solid state color image sensing arrays have been proposed that make highly efficient use of the individual picture sensing elements of the arrays by selectively sensitizing the elements to respective wavelengths of light, the number of elements thus sensitized to a particular wavelength being proportioned on the basis of human visual acuity at such wavelengths. See, for example, U.S. Pat. No. 3,971,065 issued July 20, 1976 to Bayer and U.S. Pat. No. 4,047,203 issued Sept. 6, 1977 to Dillon. The outputs of such arrays are sampled analog color video signals composed of successive groups of color samples, such groups representing successive rows or lines of a video field or frame. If the problem of providing a relatively low-cost recorder could be solved, these solid state color image sensors would lend themselves nicely to the design of a minimum-cost, mass-produced, color video camera/recorder for the consumer market.

Although video recording and reproduction is well known, video tape recorders that are presently priced within the range of the consumer market employ the concept of a rotating magnetic head for recording a television signal on magnetic tape. The rotary head mechanism provides a very high density, relatively wide bandwidth recording by rapidly rotating a magnetic head(s) relative to the tape to produce many parallel tracks disposed generally across the width of the tape. While the rotating head concept achieves the goal of high density, large bandwidth recording, it does so at the expense of a requirement for precision parts in the rotary head mechanism and tape transport system resulting in relatively high manufacturing costs for a rotary head recording system.

It has long been appreciated that the simplicity of an "essentially-fixed" head design for video tape recording and playback apparatus could result in very desirable manufacturing economies. "Essentially-fixed" as used herein means non-rotating, some movement of the recording head, such as toward and away from the recording medium, or to and from in the direction of relative head-to-medium travel, is contemplated within the meaning of "essentially-fixed".

The most straightforward approach to a fixed head video tape recorder design would appear to be one in which the recording tape is moved past an essentially-fixed magnetic recording head at a speed sufficiently high to accommodate the relatively wide bandwidth video signal, e.g., approximately three meters per second for a standard NTSC color television signal. Although such systems have been implemented, they require high speed precision operating mechanisms for their tape transports, and relatively long lengths of tape stored on large reels for producing programs of reasonable length, and hence are impractical for a product aimed at the consumer market.

In a variety of prior art essentially-fixed head systems, the relative head/tape speed is reduced by separating the video signal into a number of component parts and assigning the parts to a corresponding number of channels. The signal components in the channels are then recorded on a corresponding number of parallel tape tracks by means of a multichannel essentially-fixed recording head. In some such prior art systems employing "time-division-demultiplexing" (e.g. U.S. Pat. No. 2,952,745 issued Sept. 13, 1960 to Walker), a video signal is periodically sampled, the samples are demultiplexed into a number of channels, and the signal portions in the channels are recorded on a corresponding number of tracks on a recording medium by a multichannel essentially-fixed recording head. For N channels, the bandwidth per channel is thereby reduced by a factor of 1/N. As few as two to as many as 600 channels have been suggested in prior art demultiplexing schemes; see U.S. Pat. No. 3,975,764 issued Aug. 17, 1976 to Kobayashi et al. In such prior art time-division-demultiplexing systems, a relatively large amount of power, at the sampling frequency, is introduced into the channels. This power at the sampling frequency tends to interfere with efficient recovery of the original signal from the recording and may result in a final signal of degraded quality.

In another prior art recording system, as shown in U.S. Pat. No. 3,502,795, issued Mar. 24, 1970 to M. Camras, the video signal is separated into components according to red, green, and blue colors, and each color component is recorded onto a separate track. Because there is more useful information in the green component of the signal, the green track is wider than the red or blue tracks. To increase the recording density on the recording medium and hence the playing time, the direction of tape transport is repeatedly reversed while shifting the lateral position of the recording head to thereby increase the total number of parallel tracks on the tape. During each tape reversal, the picture may be momentarily disrupted.

Although multi-track essentially-fixed-head recording would appear to offer substantial cost benefits for use in a color-video camera/recorder for the consumer market, to date, none of the prior art essentially-fixed head, multi-track recording schemes have proven commercially successful.

SUMMARY OF THE INVENTION

According to the present invention, a color video signal, composed of successive groups of analog color samples, successive samples in at least some of said groups alternating between one color and another wherein such groups represent successively scanned rows or lines of video frames or fields, is separated sample-by-sample. The samples are assigned to respective channels of substantially equal bandwidth such that each channel carries successive subgroups of samples of only one color per subgroup, thereby minimizing the power in the respective channels at the sample rate. The signal in the channels is recorded on a plurality of parallel tracks—one track per channel—on a recording medium by a multichannel essentially-fixed recording head.

In a preferred embodiment of the invention, the color video signal contains groups of samples of red, green and blue color information, green samples occurring more frequently than red or blue. The signal is separated sample-by-sample and the samples assigned to eight channels in a manner such that for each group of samples, four subgroups of green samples are assigned to four channels, and subgroups of red samples and/or subgroups of blue samples are assigned to the other four channels.

BRIEF DESCRIPTION OF THE DRAWINGS

The invention will be described in detail with reference to the drawings, wherein:

FIG. 6a–h are signal timing diagrams illustrating signal processing performed by the circuit shown in FIG. 7;

FIG. 10a–m are signal timing diagrams illustrating the signal processing provided by the playback electronics shown in FIG. 9.

DESCRIPTION OF THE PREFERRED EMBODIMENTS

Figure 1:
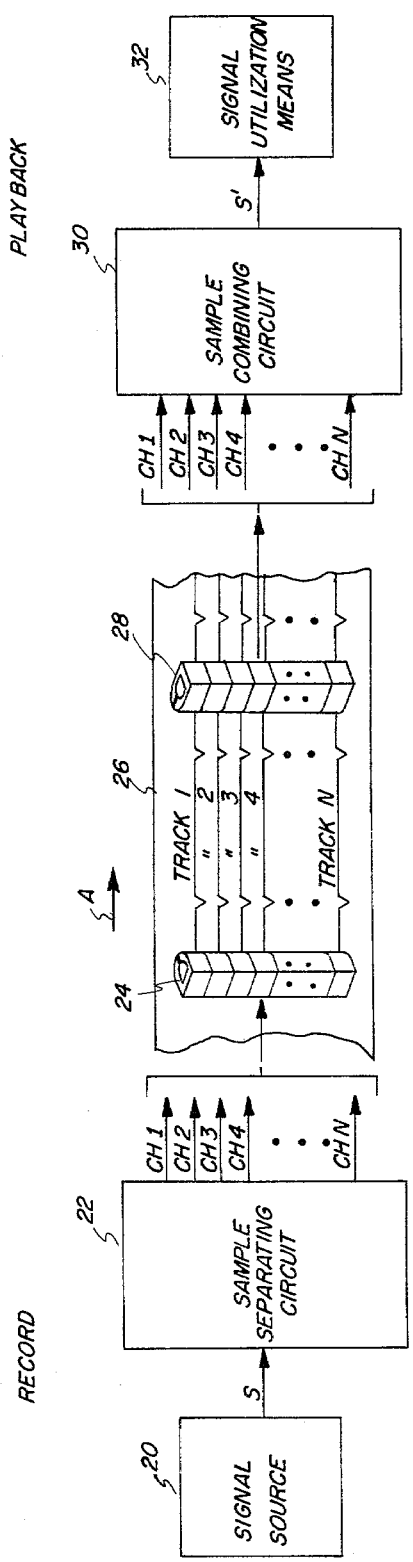
FIG. 1 is a schematic block diagram showing signal processing and recording according to the present invention.
Figure 2:
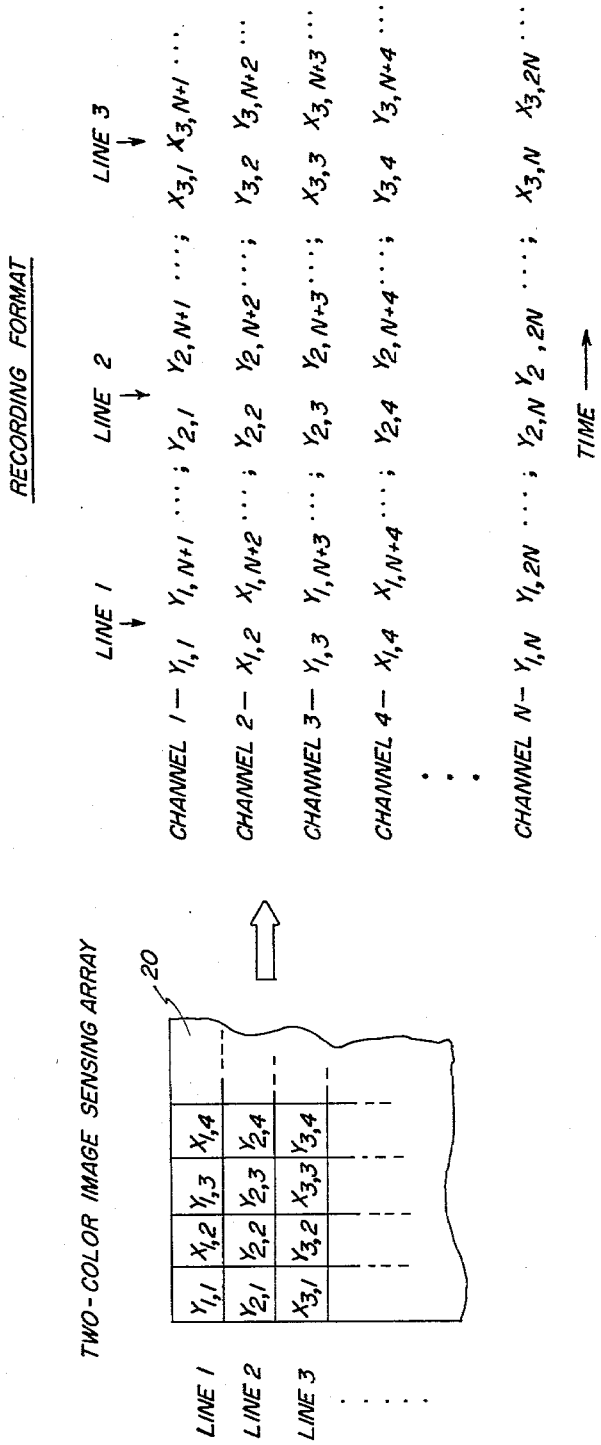
FIG. 2 is a generalized example of a recording format according to the present invention employing a two-color imaging array as a signal source.

The general principle of operation of the present invention will first be described with reference to FIGS. 1 and 2. A sampled-analog color video signal S is supplied by signal source 20. In the embodiments described below, a signal source comprises an array of solid state image sensing elements wherein respective elements of the array are selectively sensitized to respective colors. However, it is to be understood that for the purpose of preparing a television recording according to the present invention, the signal source 20 could comprise a conventional source of a color television signal such as a conventional television camera, and suitable processing electronics to produce from such signal a color video signal composed of successive groups of analog color samples. A simplified example of a portion of a two-color solid state imaging array 20 is shown in FIG. 2. Elements of the array are selectively sensitized to one of two ranges of wavelengths of light or colors. Elements labelled Y are sensitized to the first color and elements labelled X to the second color. Assuming, for example, that human visual acuity is four times higher for the first color than it is for the second color, the array 20 has been provided with four times as many elements labelled Y as it has been with elements labelled X. As shown in FIG. 1, the signal S produced by signal source 20 is applied to the input of a sample separating circuit 22. Signal S is separated sample-by-sample in circuit 22 and samples are assigned to respective channels in such a way that respective channels contain subgroups composed of samples of only one color. An example of this assignment is represented in FIG. 2 where the analog color samples from the two-color array are shown assigned to N channels where N is a submultiple of the number of samples in a group and also a multiple of the repetition sequence of color samples (in this case two). The required bandwidth per channel for recording the signal will then be 1/N times the bandwidth that would be required for recording the entire signal in just one channel. The first sample $Y_{1,1}$ from the first element in the first row is assigned to channel 1, the second sample $X_{1,2}$ is assigned to channel 2, and so on until the Nth sample in line 1 is assigned to channel N. The next sample may then be assigned to channel 1 and so on until all the samples in the group generated by the first line of elements have been assigned to a channel. It will be noted that all the elements in the next line, line 2, are sensitized to the first color. Hence the subgroups representing line 2 in all N channels will be composed of samples representing the first color. Thus, the samples in successive groups are assigned to channels such that each channel contains successive subgroups of samples representing only one color per subgroup. The importance of this feature may be appreciated by considering the recording of a simple scene consisting of a single hue made up of unequal amounts of the first and second colors. If the samples in a subgroup in a given channel were to alternate between the first and second colors, there would be a change in signal level for each sample. The transition from one signal level to the next (as opposed to the signal levels themselves) would not represent any useful information contained in the original scene, but would be entirely due to the sampling and signal processing. These abrupt transitions from sample to sample would introduce a relatively large amount of power into the signal at the sampling frequency. In reproducing the video signal, this relatively large amount of power at the sampling frequency is likely to introduce unwanted distortion into the signal. In contrast, according to the present invention, there are no changes from sample to sample in the subgroup of samples for the simple scene thus described. The signal level in each channel may remain constant for the duration of the scan line. Upon playback, according to the present invention, for any scene, there will be less power at the unwanted sampling frequency that must be removed from the signal. In this way, a much more efficient recording format is provided. Admittedly, for any scene other than a simple monochrome, there will be some power in the recorded signal resulting from the sampling. As a result of the present invention, however, the amount of such power will nevertheless be minimized. Further, the recording density will be optimized without including more information per color component than is useful to the viewer or providing for a specially constructed recording head having some relatively low bandwidth channels and some relatively high bandwidth channels.

Returning now to FIG. 1, the samples in the N channels are supplied to a multigap essentially-fixed recording head 24 that is adapted to record the signal carried by the N channels onto N parallel tracks of a suitable recording medium such as magnetic tape 26. The tape is moved relative to the head 24 in the direction of arrow A.

Thus, according to the present invention, a wide band sampled analog color television signal is recorded using relatively inexpensive essentially-fixed head recording equipment making optimum use of the storage capabilities of the recording medium.

The recording is "played back" by moving the tape 26 relative to a multigap playback head 28. As is well known, the playback portion of the apparatus may share components with the record portion of the apparatus, such as the recording medium transport system, or may include separate components as a stand-alone unit. The N tracks are passed relative to the playback head to produce signal samples in N playback channels. The samples in the channels are applied to a sample combining circuit 30 which recombines the samples from the N playback channels and may include signal processing circuitry to produce a signal S' suitable for use by some signal utilization means 32 such as a standard television receiver. The signal S' may be in the same form as the original signal S, or may be in an altered form, such as a plurality of signals representing the color components of S, or an NTSC composite video signal, or another standard composite color video signal such as PAL or SECAM.

Figure 3:
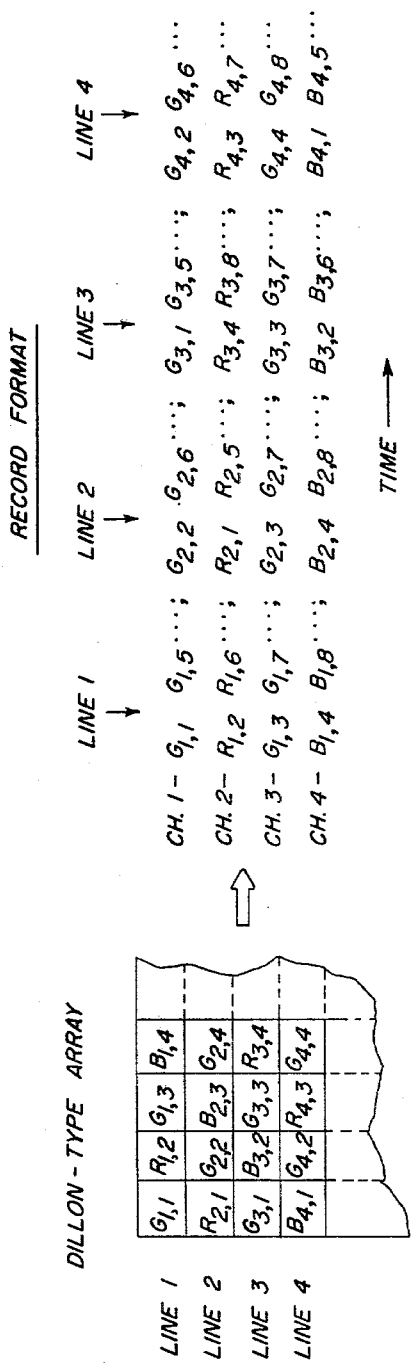
FIG. 3 is an example of a recording format according to the present invention wherein the signal source is a three-color array of the type having sampling sites selectively sensitized to three primary colors in every line.
Figure 4:
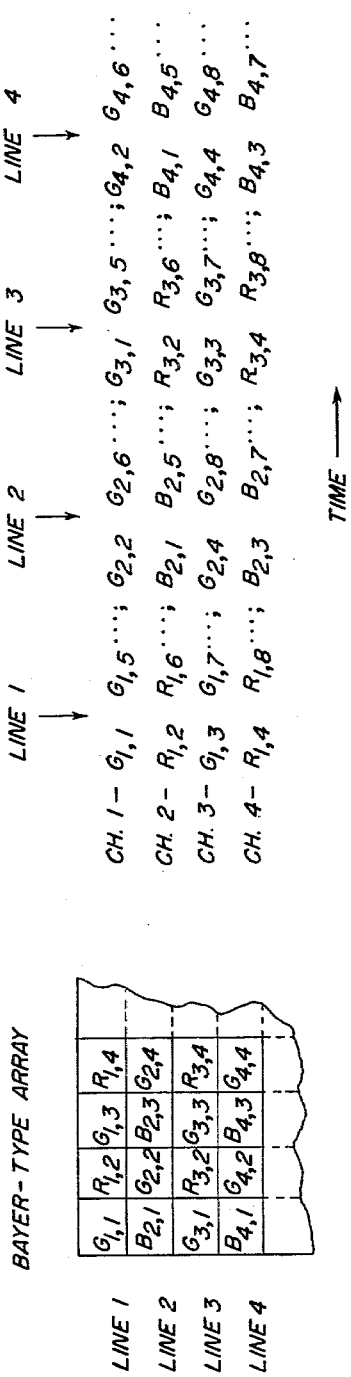
FIG. 4 is an example of a recording format according to the present invention wherein the signal source is a three-color array of the type having sampling sites selectively sensitized to two primary colors per line.

FIGS. 3 and 4 illustrate "recording formats" according to the present invention wherein the signal source is a three-color imaging array having elements sensitized to red, green and blue.

FIG. 3 also shows a portion of an array of the type disclosed in U.S. Pat. No. 4,047,203 issued Sept. 6, 1977 to Dillon. In the Dillon array, red-, green- and blue-sensitive elements occur in each line of the array. In the example shown, channels 1 and 3 carry subgroups of green samples, channel 2 carries subgroups of red samples, and channel 4 carries subgroups of blue samples.

FIG. 4 also shows a portion of a three-color array of the type disclosed in U.S. Pat. No. 3,971,065 issued July 20, 1976 to Bayer. In this example, alternate lines contain either red- or blue-sensitive elements interspersed with green-sensitive elements. As shown in FIG. 4, the recording format according to the present invention comprises two channels containing subgroups of green samples, channels 1 and 3, and two channels which alternate between subgroups of red samples in the odd numbered lines and subgroups of blue samples in the even numbered lines. The rule for assigning samples to the channels according to the present invention is that only samples of one color may occur in any given subgroup in any channel.

The examples illustrated in FIGS. 3 and 4 show the signal being separated into four channels, however, it is to be understood that any number N of channels may be employed, according to the invention, as long as the above noted rule for assigning samples to channels is observed.

It should be noted, from the example of FIG. 4, that the first sample in a line may not necessarily be assigned to channel 1. The sample separating circuit, to be described in more detail below, may be configured to assign any given sample to any given channel as long as the above noted rule is followed.

Figure 5:
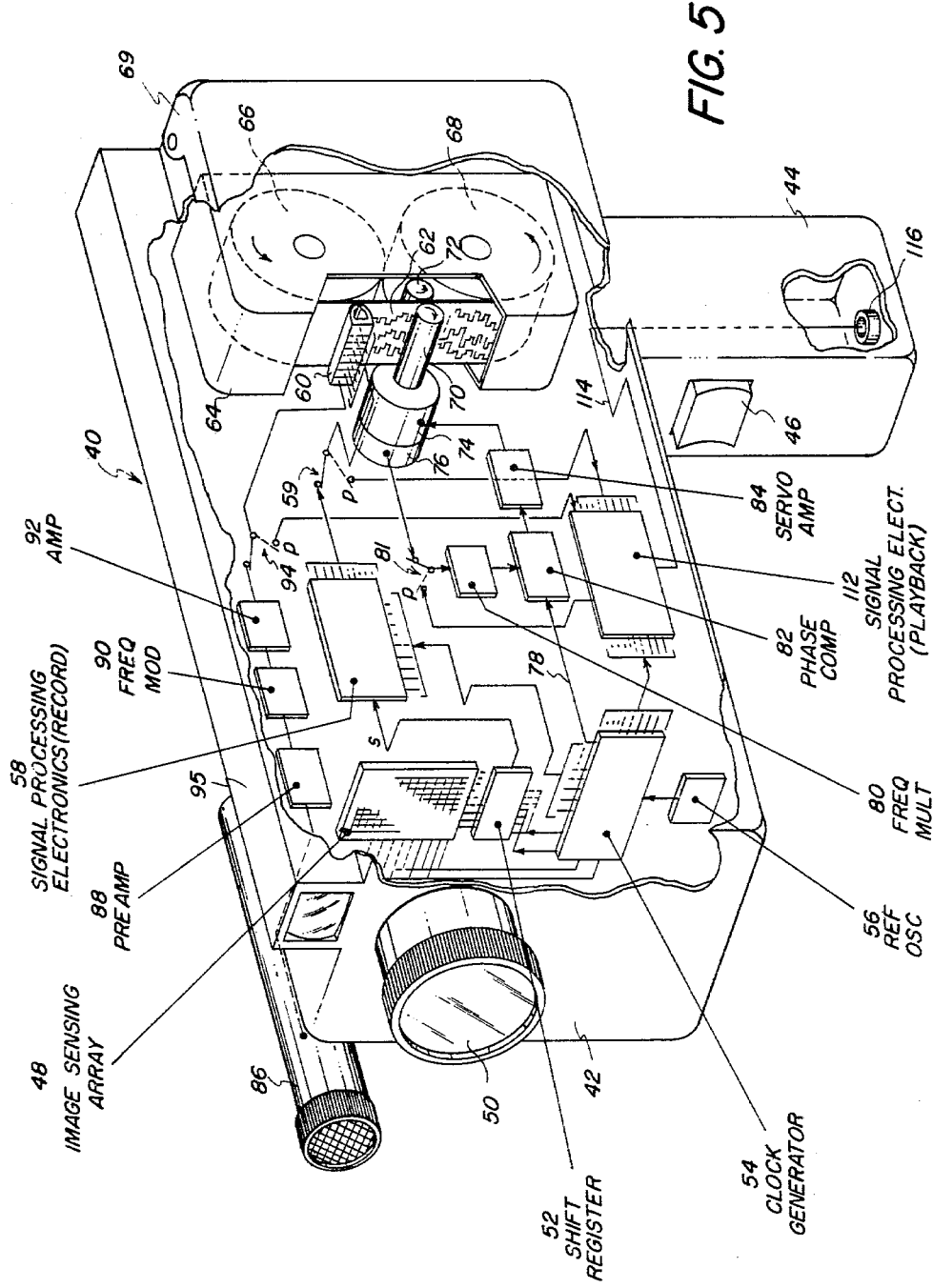
FIG. 5 is a perspective, partially broken away, view showing a color video camera/recorder employing signal processing and a recording format according to the present invention.

According to a preferred embodiment of the present invention, the recording format is employed in a video camera/recorder as shown in FIG. 5. The camera/recorder, generally designated 40, includes a housing 42 that is shown partially broken away to reveal, in generally schematic form, the video signal source, signal processing electronics, and tape handling mechanism. A pistol grip type handle 44 includes an operator accessible trigger switch 46 for activating the camera/recorder. The signal source is a solid state image sensing array 48 of the type shown in FIG. 3. An objective lens 50 carried by the housing 42 focuses scene light on the image sensing array 48. As described above, the image sensor comprises a rectangular array of individual picture sensing elements selectively sensitized to red, green, or blue wavelengths of light. The array preferably comprises 484 lines of 320 elements each, but other numbers of lines and numbers of elements per line may be chosen depending upon the particular design constraints chosen. The image sensing array preferably comprises a solid state image sensing device such as an interline transfer, charge-coupled imaging array fabricated on a chip of semiconductor material. Image information is transferred from the array one line at a time in a parallel fashion into a shift register 52 from whence it is serially shifted to form a sampled analog type signal S comprising successive samples of green, red, or blue picture information. The shift register 52 may be manufactured "on board" the chip bearing the imaging array. The respective shifting operations are controlled by clock pulses generated in a known manner by a clock pulse generator 54 to which is supplied a reference frequency by a local reference oscillator 56. The clock pulse generator also supplied clock pulses to the other elements of the apparatus as described below.

The signal S, comprising red, green and blue samples, is supplied to signal processing electronics 58 where the signal is separated sample-by-sample, and the samples are assigned to respective channels. In a presently preferred embodiment of the camera/recorder, the signal S is separated by signal processing electronics 58 and the samples assigned to eight channels, four of such channels carrying green samples, two carrying red samples, and two carrying blue samples. The output carried by the eight channels from processing electronics 58 is supplied respectively through a multiple contact switch 59 (one set of contacts for each channel) to an essentially-fixed multigap recording head generally designated 60 having a number of recording gaps—each channel corresponding to a separate gap—to thereby record the signal carried by the eight channels on eight tracks of a magnetic tape 62. Several representative tracks are depicted schematically on the tape 62 in FIG. 5.

Magnetic tape 62 is contained, for example, in a cartridge 64 that includes a supply reel 66 and a takeup reel 68. A door 69 is provided in housing 42 to provide operator access to the tape cartridge 64. A capstan 70 is driven by a capstan motor 74 which is controlled by a phase locked loop servo control system. The capstan 70, cooperating with a pinch roller 72, drives tape 62 past the essentially-fixed head 60 at a controlled rate. Included in the servo control system are a tachometer 76 for supplying a feedback signal, a frequency multiplier 80, a phase comparator 82, and a servo amplifier 84. Frequency multiplier 80 receives the feedback signal from tachometer 76 via switch 81 and supplies a frequency-multiplied feedback signal to phase comparator 82. Phase comparator 82 receives a reference signal, on line 78, generated by clock generator 54 and generates an error signal representing the difference in phase between the reference signal and the feedback signal from multiplier 80. The error signal thus generated is fed to servo amplifier 84 which in turn powers the capstan motor 74. It should be noted that the frequency multiplier 80 will not be required if the tachometer is designed to provide an output at the reference frequency when the capstan motor 74 is operated at nominal speed.

A microphone 86 is provided for recording sound associated with the video scene being recorded. The signal generated by the microphone is amplified in a preamplifier 88, modulated on an FM carrier by frequency modulator 90, and amplified by an amplifier 92. The signal is then supplied via switch 94 to a sound recording portion of multigap recording head 60. Alternatively, the sound signal may be directly recorded without frequency modulation, or it may be frequency multiplexed with one of the video signal portions and recorded therewith on one video track.

The camera/recorder is shown having an optical viewfinder 95; it is well known, however, to provide a small monitor affixed to the camera as a viewfinder.

Figure 7:
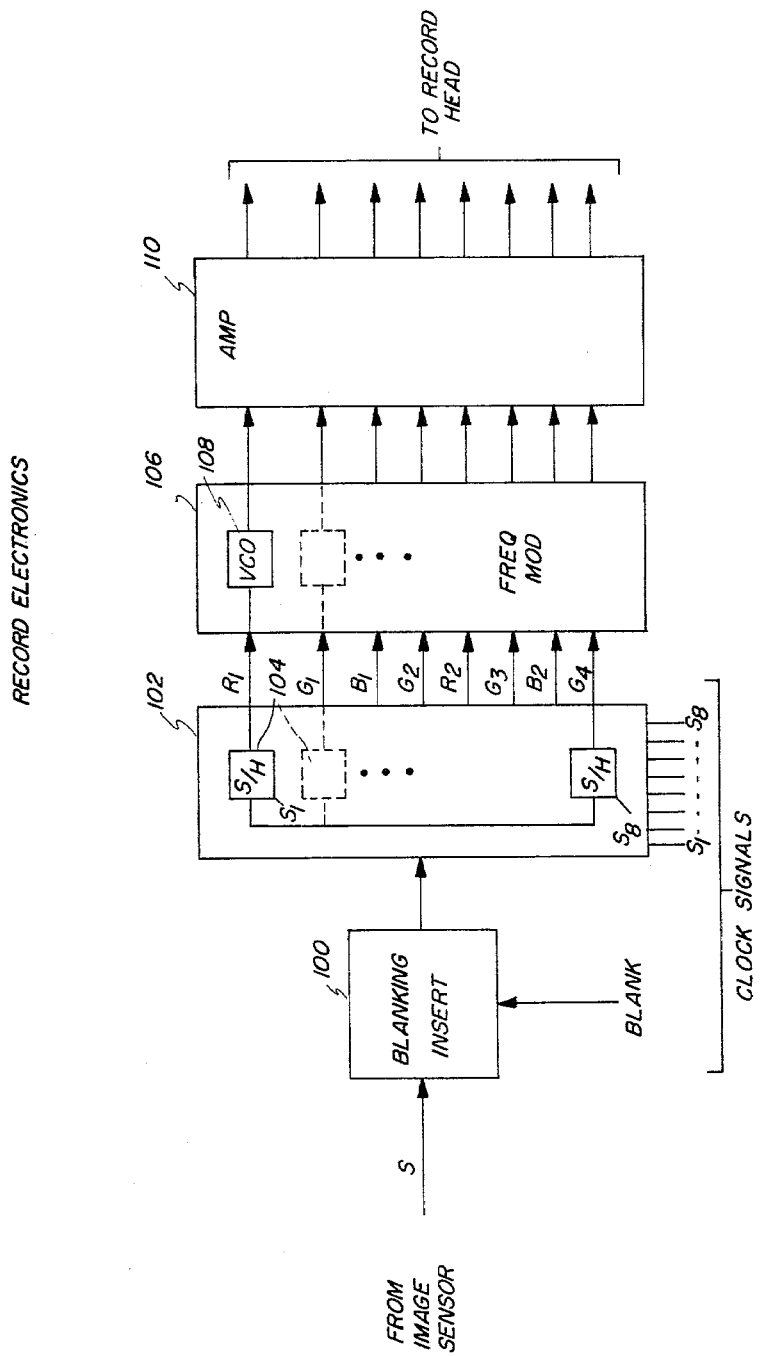
FIG. 7 is a schematic diagram showing the recording electronics of the camera/recorder shown in FIG. 4.

The signal processing portion of the recording electronics 58 will now be described in greater detail with reference to FIGS. 6 and 7. As shown in FIGS. 6a and 6b the signal S from image sensor 48 comprises line-by-line groupings of 320 color samples per line which are clocked out of shift register 52 (FIG. 5) in about $53\frac{1}{2}$ microseconds at a rate of approximately 6 MHz. Between each group of samples there is a quiescent period of about ten microseconds during which the signal coming from the shift register remains at the black level. FIG. 6b shows an expanded portion of the signal S. As can be seen, the signal comprises color samples that repeat every four samples in the pattern R, G, B, G. As described in the Dillon U.S. Pat. No. 4,047,203, the color of the first sensor of each succeeding line is chosen in a predetermined manner to yield a desired overall two-dimensional sampling pattern. As shown in FIG. 7, the record electronics receives signal S from sensor 48; and a blanking insert circuit 100, which is supplied by a blanking signal from the clock generator 54, inserts a blanking level in the ten microsecond periods between the successive groups of color samples. The blanking signal which occurs at the 15.734 kHz line scan frequency is shown by dotted lines in FIG. 6a. Although the blanking signal is shown as being inserted into the signal S, prior to separating the samples so that each channel contains a blanking signal between groups of samples, it should be noted that, alternatively, a blanking signal could be inserted into each channel by a plurality of pulse inserting circuits. The video signal, with blanking levels thus inserted, is supplied to a 1–8 channel sample separating circuit 102 where samples of the signal are assigned to respective channels. The circuit 102 comprises eight sample and hold circuits 104 which all receive the signal S and which respectively receive sampling signals $S_1$ through $S_8$ which are supplied by the clock generator 54.

A representative sampling signal $S_1$ for the first channel is shown in FIG. 6d. The resulting signal $R_1$, in the first channel is shown in FIG. 6c. Likewise, representative portions of the $G_1$ and $G_4$ signals and their respective sampling signals are shown in FIGS. 6e–h. Since the signal S which contains 320 samples per group is separated into eight channels there will be 40 samples per subgroup in the eight channels, and, as is characteristic of the invention, each such group of samples will contain samples of only one color.

The AM signal in the eight channels may be amplified and applied directly to the multigap recording head 60 according to the procedure known as linear or direct recording. However, in order to improve the recorded signal-to-noise ratio, the eight channels from the circuit 102 are supplied to a frequency modulator 106 comprising eight voltage controlled oscillators, one of which is shown for the $R_1$ channel and labelled 108. The frequency modulated signals are then amplified in an amplifier 110 and applied to multigap magnetic recording head 60 (FIG. 5).

For playback and reproduction of the signal stored on the magnetic tape 62, the switches 59, 81, and 94 are placed in their respective playback positions (labelled P and indicated by dotted lines in FIG. 5). Switch 59, in its playback position, connects the portion of essentially-fixed magnetic head 60 that reproduces the eight tracks of video information to eight corresponding inputs of a playback signal processing circuit 112. It should be noted that a single multigap head is shown for both recording and playback in the camera/recorder. However, it may be desirable to include separate record and playback heads, with suitable modification to the circuit shown in FIG. 5, so that the heads may be specifically tailored to their respective tasks. Switch 94 connects the audio track to a corresponding input to the signal processing circuitry 112, and switch 81 connects frequency multiplier 80 of the motor control electronics to a reference signal generated by the playback electronics for controlling the tap drive mechanism during playback. The signal processing electronics 112 receive clock signals from clock generator 54 to control the playback signal processing. The processed signal, in a format suitable for supplying to a standard TV set, is applied via an output line 114 to a socket 116 in the bottom of the handle of the camera/recorder.

Figure 8:
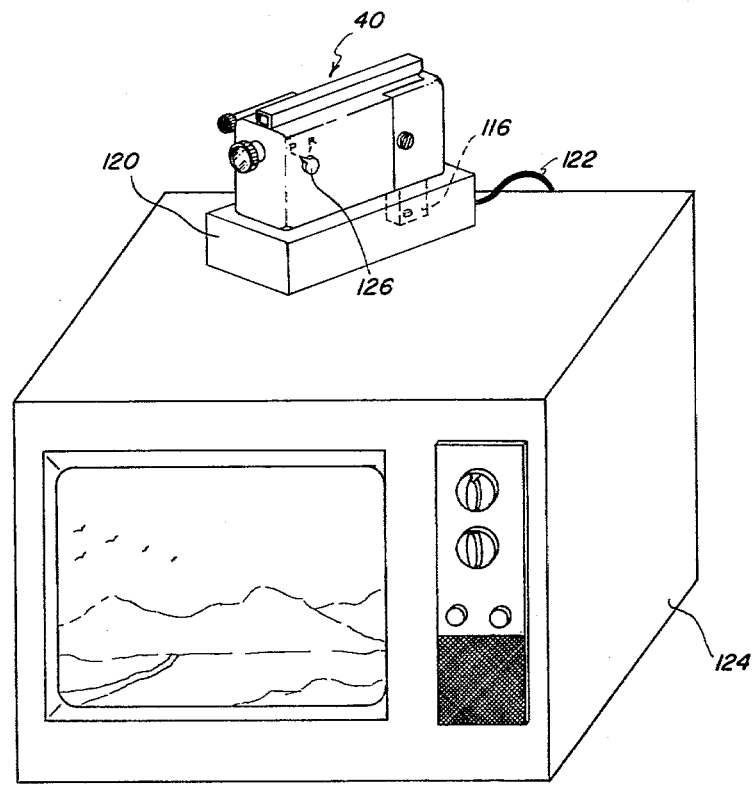
FIG. 8 is a perspective view of the camera/recorder shown in FIG. 5 in a playback mode, and connected to a standard television receiver.

FIG. 8 shows the camera/recorder 40 cradled in a receiver 120 adapted to hold the camera/recorder in a convenient location near a TV set 124. The receiver 120 includes a jack adapted to connect with socket 116 and a conductor 122 that connects to the antenna input of the TV set 124. A knob 126 is provided on the housing of the camera/recorder 40 for setting the respective internal switches in their playback position. As shown, receiver 120 merely provides physical support for the camera/recorder 40 and an electrical connection to the output of the camera/recorder. However, for purposes of conserving space in the camera/recorder, the signal processing electronics shown in the camera/recorder 40 could be included in receiver 120 with appropriate connections being provided between the camera/recorder and the receiver 120.

Figure 9:
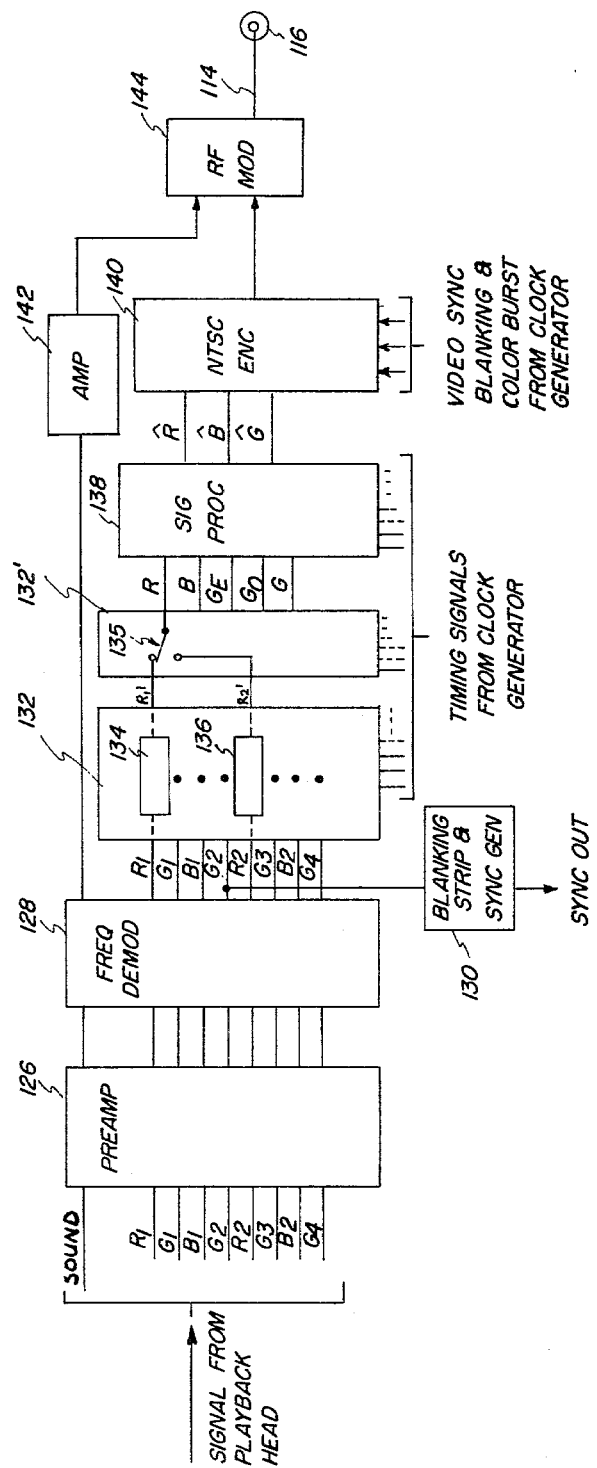
FIG. 9 is a schematic diagram of the playback electronics of the camera/recorder shown in FIG. 5.

The operation of the playback signal processing electronics will now be described with reference to FIGS. 9 and 10. As shown in FIG. 9, the nine signals from the essentially-fixed multigap head 60, i.e. the eight video channels and the one sound channel, are first amplified in a preamplifier 126. The signals from preamplifier 126 are supplied to a frequency demodulator 128 wherein they are demodulated in a known manner to produce "varying amplitude color-sample signals". Of course, in the event that varying amplitude color-sample signals had been recorded, the demodulation step would not be required. The blanking pulses from one of the channels, say the $G_2$ channel, as shown in FIG. 9, are stripped in a blanking strip circuit 130 and the leading edges of the blanking pulses are detected to generate a reference sync signal in known manner. This reference sync signal is supplied to the frequency multiplier 80 via switch 81 to provide a feedback signal to control the capstan motor speed via the phase locked loop servo circuit during playback. A form of signal distortion known as flutter may be present in the video signal reproduced from the tape and the phase locked loop servo is designed to reduce the amount of such flutter distortion in the signal. In addition to flutter, the signals emerging from the frequency demodulator may also be "skewed" as a result of the signal processing described above and/or as a result of any physical tape skew that may have occurred with respect to the magnetic head 60. The head 60 may also exhibit some gap scatter which will affect the video signal. The effects of head gap scatter may be especially prevalent if the tape being reproduced was recorded on another camera/recorder having slightly different head gap alignment.

The video signal emerging from the frequency demodulator is represented in FIGS. 10a-c, where the output of the $R_1$, $R_2$, and $G_4$ channels are shown by way of examples. The results of scatter and skew are shown as misalignment between corresponding subgroups of samples in respective channels. Since flutter may result in an objectionable time base error in the reproduced signal, and scater and skew may prevent the sample in the reproduced signal from being properly recombined, these distortions must be removed from the reproduced video signal prior to further signal processing. The distortions are removed in a distortion correcting circuit 132 comprised of a bank of eight deflutter buffers, i.e., one deflutter buffer per channel. Deflutter buffers 134 and 136 for the $R_1$ and $R_2$ channels respectively are shown by way of example. The signal samples in he eight video channels are combined by circuit 132' to form "red", "blue", "green even", "green odd", and "high frequency green" signals for further processing as described below. The signals are formed by multiplex switches controlled by timing signals from clock generator 54 appearing in FIG. 5. An example of the signal combining arrangement is shown for the "red" channel wherein a multiplex switch 135 under the control of timing signals from clock generator 54 selectively connects the output of deflutter buffer 134 and deflutter buffer 136 to the "red" channel. Samples are clocked from buffers 134 and 136 to construct a "red" signal that contains the interspersed samples of the $R_1$ and $R_2$ channels.

Examples of the defluttered outputs from the $R_1$, $R_2$ and $G_4$ deflutter buffer are shown in FIGS. 10d-f.

An expanded portion of the $R_1$ and $R_2$ signals and the associated clock signals from clock generator 54 are shown in FIG. 10g-j. A portion of the resulting "red" signal is shown in FIG. 10k. The outputs of the remaining deflutter buffers are similarly combined to produce the other signal components useful for further signal processing. The multiplexed signals from circuit 132' may be supplied to a signal processing circuit 138 of the type disclosed in U.S. Pat. No. 4,176,373 issued Nov. 27, 1979 to P. L. P. Dillon and B. E. Bayer, and entitled "Signal Processing for Discrete-Sample-Type-Color-Video Signal". In general, such signal processing circuitry smooths the sampled analog signal by interpolating along rows or lines of video information, and produces a luminance detail signal from the difference between a "slow" green signal and a "fast" green signal.

The detail signal is added to the "red" and "blue" signals to yield R, B and G signals of the form that would be produced by a standard television camera. A portion of the smoothed R signal from the signal processing electronics 138 is shown in FIG. 10-1. Processing circuitry 138 may also contain the edge enhancement circuitry more fully described in U.S. Pat. No. 4,148,059 issued Apr. 3, 1979 to P. L. P. Dillon and B. E. Bayer. The timing signals required by the processing circuitry 138 are supplied from the clock generator 54. The R, B and G signals are applied, along with a composite video sync pulse, a blanking pulse, and a 3.58 MHZ color burst frequency—all generated by clock generator 54—to an NTSC encoder 140 of known configuration. The resulting output is a composite video signal such as shown in FIG. 10m suitable for display on a color TV set. The signal is modulated on an RF carrier by RF modulator 144 (shown in FIG. 9) for display on a standard TV set. The sound signal from the frequency demodulator 128 is amplified in an amplifier 142 and likewise supplied to the RF modulator. The resulting signal on line 114 is applied to receptable 116 of the camera/recorder and is adapted to be applied to the antenna inputs of a standard TV set for reproducing the video program.

The invention has been described in detail with particular reference to a certain preferred embodiments thereof, but it will be understood that variations and modifications can be effected within the spirit and scope of the invention.

What is claimed is:

1. Video recording apparatus comprising:
   (a) means for producing a color video signal composed of successive groups of analog color samples, successive samples in at least some of said groups alternating between one color and another, such groups representing successive lines of a video field or frame;
   (b) means for separating the color samples of said groups and for assigning said samples to a plurality of subgroups so that each subgroup contains samples of one color;
   (c) means for assigning said plurality of subgroups to a corresponding plurality of channels of substantially equal bandwidth; and
   (d) means including a multichannel essentially-fixed recording head for recording the signal samples in said channels on a corresponding plurality of parallel tracks on a recording medium.

2. Video recording/playback apparatus comprising:
   (a) means for producing a color video signal composed of successive groups of analog color samples, successive samples in at least some of said groups alternating between one color and another, a group representing a line of a video field or frame;
   (b) means for separating, sample-by-sample, a group of said samples and assigning said samples to a plurality of channels of substantially equal bandwidth such that each of said channels contains a subgroup of analog color samples, said subgroup having samples of only one color;
   (c) means including a multichannel essentially-fixed recording head for recording the subgroups of samples in said channels on a corresponding plurality of parallel tracks on a recording medium;
   (d) means including a multichannel essentially-fixed playback head for reproducing the subgroups of samples recorded in said tracks in a plurality of channels; and
(e) signal processing means, connected to said plurality of channels, including signal sampling and combining means, for producing a composite video signal suitable for display.

3. Video recording apparatus comprising:
(a) means for producing a color video signal composed of successive groups of analog color samples, successive samples in at least some of said groups alternating between one color and another, said groups containing N samples per group and each of said groups representing one line scan of a video frame or field;
(b) means for separating a group, sample-by-sample, and for assigning said samples to M channels of substantially equal bandwidth such that such channels contain subgroups of N/M samples, respective subgroups having samples of only one color; and
(c) means including a multichannel essentially-fixed recording head for recording the subgroups of samples, carried by said channels, on M parallel tracks on a recording medium.

4. A video camera/recorder, comprising:
(a) means including a solid state image sensing array for producing a color video signal composed of successive groups of analog color samples, successive samples in at least some of said groups alternating between one color and another, a group representing a line of a video frame or field;
(b) means for separating a group, sample-by-sample, and for assigning said samples to a plurality of channels of substantially equal bandwidth such that the samples in a channel comprise a subgroup of samples, said subgroup having samples of only one color; and
(c) means including an essentially-fixed multichannel magnetic recording head for recording the subgroups of samples carried by said channels on a corresponding plurality of parallel tracks on a magnetic recording tape.

5. Video recording apparatus of the type adapted to record a color video signal on a plurality of parallel tracks on a recording medium by means of a multi-channel essentially-fixed recording head, characterized by: said color video signal being composed of successive groups of analog color samples, successive samples in at least some of said groups alternating between one color and another, a group representing a line of a video frame or field, and said recording apparatus including means for separating a group, sample-by-sample, and assigning said samples to a plurality of channels of substantially equal bandwidth such that the samples carried by said channels comprise subgroups of samples of like color.

6. The recording apparatus of claim 5, further characterized by: the samples of said color video signal representing first and second colors, there being more samples of said first color than of said second color in said signal based on human visual acuity to said colors, and subgroups of samples of said first color occurring more frequently in said channels than subgroups of samples of said second color.

7. A video recording, comprising: a magnetic recording tape having a plurality of parallel tracks of substantially equal bandwidth recorded along the length thereof, said tracks bearing a sampled analog color video signal composed of successive groups of analog color samples, successive samples in at least some of said groups alternating between one color and another, a group representing a line of a video field or frame, each such track bearing successive subgroups of samples of like color thereby minimizing the power recorded in such tracks at the sample frequency and providing a relatively wide band color video recording capable of being reproduced on relatively narrow band per channel essentially-fixed head recording apparatus.

8. A video recording, comprising: a magnetic recording tape having M parallel tracks of substantially equal bandwidth recorded along the length thereof, said tracks bearing a sampled analog color video signal composed of successive groups of N analog color samples per group, successive samples in at least some of said groups alternating between one color and another, a group representing a line scan of a video field or frame, each such track bearing successive subgroups of N/M analog samples, the samples in respective subgroups being of like color.

9. Video recording apparatus comprising:
(a) means for producing a color video signal composed of successive groups of analog samples representing first or second colors, successive sample in at least some of said groups alternating between one color and another, samples representing said first color occurring more frequently in said signal than samples representing said second color, based on human visual acuity to said respective colors;
(b) means for separating a group, sample-by-sample, and assigning said samples to a plurality of channels of substantially equal bandwidth such that each channel carries a subgroup of samples of only one color, subgroups of samples of said first color occurring more frequently in said channels than subgroups of said second color; and
(c) means including an essentially-fixed multichannel recording head for recording the samples in said channels on a corresponding plurality of parallel tracks on a recording medium.

10. A color video camera/recorder, comprising:
(a) means, including a solid state image sensing array, for producing a color video signal composed of successive groups of green, red, or blue color samples, successive samples in at least some of said groups alternating between one color and another, a group representing a line of a video field or frame, said green samples occurring more frequently in said signal than red or blue samples, based on human visual acuity to the respective colors;
(b) means for separating, sample-by-sample, said signal, and assigning respective samples to one of a plurality of channels of substantially equal bandwidth such that each channel carries successive subgroups of samples, the samples in respective subgroups being of like color, subgroups of green samples occurring more frequently in said channels than subgroups of red or blue; and
(c) means including a multichannel essentially-fixed magnetic recording head, for recording the signal in said channels on a corresponding plurality of parallel tracks along the length of a magnetic recording tape.

11. A method for recording a color video signal, comprising the steps of:
(a) producing a color video signal composed of successive groups of analog color samples, successive samples in at least some of said groups alternating between one color and another, a group representing a line of a video field or frame;
(b) separating a group of samples of said signal, sample-by-sample;
(c) assigning said samples to a plurality of channels of substantially equal bandwidth so that each channel carries successive subgroups of analog color samples, the samples within each subgroup being of the same color; and
(d) recording the signal in said channels on a plurality of parallel tracks, one-track-per-channel, on a recording medium.

12. A method of recording and reproducing a color video signal, comprising the steps of:
(a) producing a color video signal composed of successive groups of analog color samples, successive samples in at least some of said groups alternating between one color and another, a group representing a line of a video field or frame;
(b) separating a group of said samples, sample-by-sample;
(c) assigning samples to respective channels of a plurality of channels of substantially equal bandwidth such that the samples in said channels comprise subgroups of samples of one color;
(d) recording the signal in said channels on a plurality of parallel tracks, one-track-per-channel, on a recording medium;
(e) reproducing the signal from said tracks in a plurality of channels; and
(f) sampling the signal in said channels and combining the samples to produce a composite color video signal suitable for display.

* * * * *